US010176755B2

(12) United States Patent
Cai

(10) Patent No.: US 10,176,755 B2
(45) Date of Patent: Jan. 8, 2019

(54) PIXEL DRIVING CIRCUIT, DISPLAY PANEL AND PIXEL DRIVING METHOD

(71) Applicant: Shenzhen China Star Optoelectronics Technology Co., Ltd., Shenzhen, Guangdong (CN)

(72) Inventor: Yuying Cai, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 9 days.

(21) Appl. No.: 15/544,001

(22) PCT Filed: May 31, 2017

(86) PCT No.: PCT/CN2017/086736
§ 371 (c)(1),
(2) Date: Jul. 15, 2017

(65) Prior Publication Data
US 2018/0336821 A1 Nov. 22, 2018

(51) Int. Cl.
*G06F 3/03* (2006.01)
*G09G 3/3233* (2016.01)

(52) U.S. Cl.
CPC ... *G09G 3/3233* (2013.01); *G09G 2320/0233* (2013.01)

(58) Field of Classification Search
CPC ........ G09G 3/3233; G09G 3/32; G06F 3/038; G06F 3/03
See application file for complete search history.

(56) References Cited

U.S. PATENT DOCUMENTS

| | | | | |
|---|---|---|---|---|
| 2007/0279337 | A1 | 12/2007 | Kim et al. | |
| 2008/0122381 | A1 * | 5/2008 | Jung | G09G 3/3233 315/291 |
| 2010/0134461 | A1 | 6/2010 | Han | |
| 2017/0206838 | A1 * | 7/2017 | Gai | G09G 3/3258 |

FOREIGN PATENT DOCUMENTS

| | | | |
|---|---|---|---|
| CN | 1551089 | A | 12/2004 |
| CN | 101097683 | A | 1/2008 |
| CN | 104680977 | A | 6/2015 |
| CN | 105528992 | A | 4/2016 |
| CN | 105931599 | A | 9/2016 |
| JP | 4590831 | B2 | 12/2010 |

* cited by examiner

*Primary Examiner* — Lun-Yi Lao
*Assistant Examiner* — Jarurat Suteerawongsa
(74) *Attorney, Agent, or Firm* — Andrew C. Cheng

(57) ABSTRACT

A pixel driving circuit is disclosed, including: a driving switch, connected between a driving power source and an OLED; a first switch, connected between the drain of the driving switch and the driving power source for inputting a first control signal; a control circuit, connected between the drain and gate of the driving switch, for inputting a second control signal and outputting a compensation current to compensate threshold voltage drift of the driving switch; a storage unit, connected between the source of a second switch and gate of the first switch, for storing a compensation voltage of compensation current compensating the driving switch. A display panel and pixel driving method are also disclosed.

10 Claims, 3 Drawing Sheets

PIXEL DRIVING CIRCUIT, DISPLAY PANEL AND PIXEL DRIVING METHOD

CROSS REFERENCE TO RELATED APPLICATIONS

This application claims the priority of Chinese Patent Application No. 201710296176X, entitled "Pixel Driving Circuit, Display Panel and Pixel Driving Method", filed on Apr. 28, 2017, the disclosure of which is incorporated herein by reference in its entirety.

BACKGROUND OF THE INVENTION

1. Field of the Invention

The present invention relates to the field of display, and in particular to the field of pixel driving circuit, display panel and pixel driving method.

2. The Related Arts

The current organic light-emitting diode (OLED) display has the advantages of small size, simple structure, active luminescence, high brightness, large viewing angle and short response time, and attracts a wide range of attention.

A conventional OLED display includes a transistor as a driving transistor for controlling the current through the OLED, so that the importance of the threshold voltage of the driving transistor is apparent. Any positive or negative drift of the threshold voltage will cause different currents flowing through the OLED under the same signal. At present, the transistor may experience threshold voltage drift during the use process because of, such as, lighting on oxide semiconductor, the voltage stress on the source and drain and other factors, which results in the current flowing through the OLED unstable, and thus causes the panel luminance not uniform.

SUMMARY OF THE INVENTION

The primary object of the present invention is to provide a pixel driving circuit, display panel and pixel driving method, to solve the problem of threshold voltage drift causing unstable current in OLED in the known technology, to achieve uniform luminance for display panel.

To solve the aforementioned issues, the present invention provides a pixel driving circuit, comprising:

a driving switch, connected between a driving power source and an organic light-emitting diode (OLED);

a first switch, connected between a source of the driving switch and the driving power source, for inputting a first control signal;

a control circuit, connected between a drain and a gate of the driving switch, for inputting a second control signal and outputting a compensation current to compensate threshold voltage drift of the driving switch;

a storage unit, connected between a source of a second switch and a gate of the driving switch, for storing a compensation voltage of the compensation current provided to the driving switch;

the second switch having a gate for inputting a third control signal and a drain for inputting a data signal, the storage unit being for storing a data voltage generated by the data signal;

the storage unit being for applying the compensation voltage and the data voltage to the driving switch.

According to an embodiment of the present invention, the control circuit comprises:

a compensation current output end, for outputting the compensation current;

a third switch, connected between the compensation current output end and the drain of the driving switch, and having a gate for inputting the second control signal;

a fourth switch, connected between the gate and the drain of the driving switch, and having a gate for inputting the first control signal.

According to an embodiment of the present invention, the first switch, the second switch, the third switch, and the fourth switch are N-type thin film transistors (TFT).

According to an embodiment of the present invention, the first switch, the second switch, the third switch, and the fourth switch are P-type thin film transistors (TFT).

The present invention provides a display panel, comprising:

a pixel driving circuit; the pixel driving circuit comprising: a driving switch, connected between a driving power source and an organic light-emitting diode (OLED);

a first switch, connected between a source of the driving switch and the driving power source, for inputting a first control signal;

a control circuit, connected between a drain and a gate of the driving switch, for inputting a second control signal and outputting a compensation current to compensate threshold voltage drift of the driving switch;

a storage unit, connected between a source of a second switch and a gate of the driving switch, for storing a compensation voltage of the compensation current provided to the driving switch;

the second switch having a gate for inputting a third control signal and a drain for inputting a data signal, the storage unit being for storing a data voltage generated by the data signal;

the storage unit being for applying the compensation voltage and the data voltage to the driving switch.

According to an embodiment of the present invention, the control circuit comprises:

a compensation current output end, for outputting the compensation current;

a third switch, connected between the compensation current output end and the drain of the driving switch, and having a gate for inputting the second control signal;

a fourth switch, connected between the gate and the drain of the driving switch, and having a gate for inputting the first control signal.

According to an embodiment of the present invention, the first switch, the second switch, the third switch, and the fourth switch are N-type thin film transistors (TFT).

According to an embodiment of the present invention, the first switch, the second switch, the third switch, and the fourth switch are P-type thin film transistors (TFT).

The present invention also provides a pixel driving method, providing a pixel driving circuit, the pixel driving circuit comprising: a driving power source, an organic light-emitting diode (OLED), a driving switch, a first switch, a second switch, a storage unit and a control circuit; the driving switch being connected between the driving power source and the OLED; the first switch being connected between a drain of the driving switch and the driving power source; the control circuit being connected between a drain and a gate of the driving switch; the storage unit being connected between a source of the second switch and a gate of the driving switch; the method comprising:

in a first time period, loading in a first control signal, a second control signal, and a third control signal, cutting of the first switch, the control circuit loading in a compensation current to compensate threshold voltage drift of the driving switch, and storing a compensation voltage in the storage unit;

in a second time period, loading in the first control signal, the second control signal, and the third control signal, conducting the second switch and cutting off the control circuit and the first switch, outputting a data signal to the storage unit, and the storage unit storing a data voltage generated by the data signal;

in the third time period, loading in the first control signal, the second control signal, and the third control signal, conducting the first switch, cutting off the second switch and the control circuit, the storage unit applying the compensation voltage and the data voltage to a gate of the driving switch, the driving power source driving the OLED to emit light.

According to an embodiment of the present invention, the control circuit comprises: a compensation current output end, for outputting the compensation current;

a third switch, connected between the compensation current output end and the drain of the driving switch, and having a gate for inputting the second control signal;

a fourth switch, connected between the gate and the drain of the driving switch, and having a gate for inputting the first control signal.

According to an embodiment of the present invention, the first switch, the second switch, the third switch, and the fourth switch are N-type thin film transistors (TFT).

According to an embodiment of the present invention, the first switch, the second switch, the third switch, and the fourth switch are P-type thin film transistors (TFT).

According to an embodiment of the present invention, a transitional time period is provided between the first time period and the second time period, and between the second time period and the third time period, for reserving time to propagate the first control signal, the second control signal, the third control signal, and the data signal.

The advantage of the present invention is as follows: in the first time period, the compensation current compensates the threshold voltage drift of the driving switch and stored in the storage unit in a form of compensation voltage; the storage unit stores the data voltage in the second time period and releases the compensation voltage and the data voltage in the third time period to control the driving voltage to drive the OLED to emit light. The compensation current and data signal are independently applied to the pixel driving circuit. Without affecting the data signal, the threshold voltage drift of the driving switch is compensated and the current through the OLED is stable, leading to uniform luminance of the display panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

DETAILED DESCRIPTION OF THE PREFERRED EMBODIMENTS

To further explain the technical means and effect of the present invention, the following refers to embodiments and drawings for detailed description. Apparently, the described embodiments are merely some embodiments of the present invention, instead of all embodiments. All other embodiments based on embodiments in the present invention and obtained by those skilled in the art without departing from the creative work of the present invention are within the scope of the present invention.

The pixel driving circuit of the present invention is applicable to OLED display, for providing stable current to the OLED to drive the OLED to emit light with uniform luminance. The OLED has the advantages of energy-saving, fast response, light weight, thinness, simple structure, and low cost, and is widely used in display devices.

Figure 1:
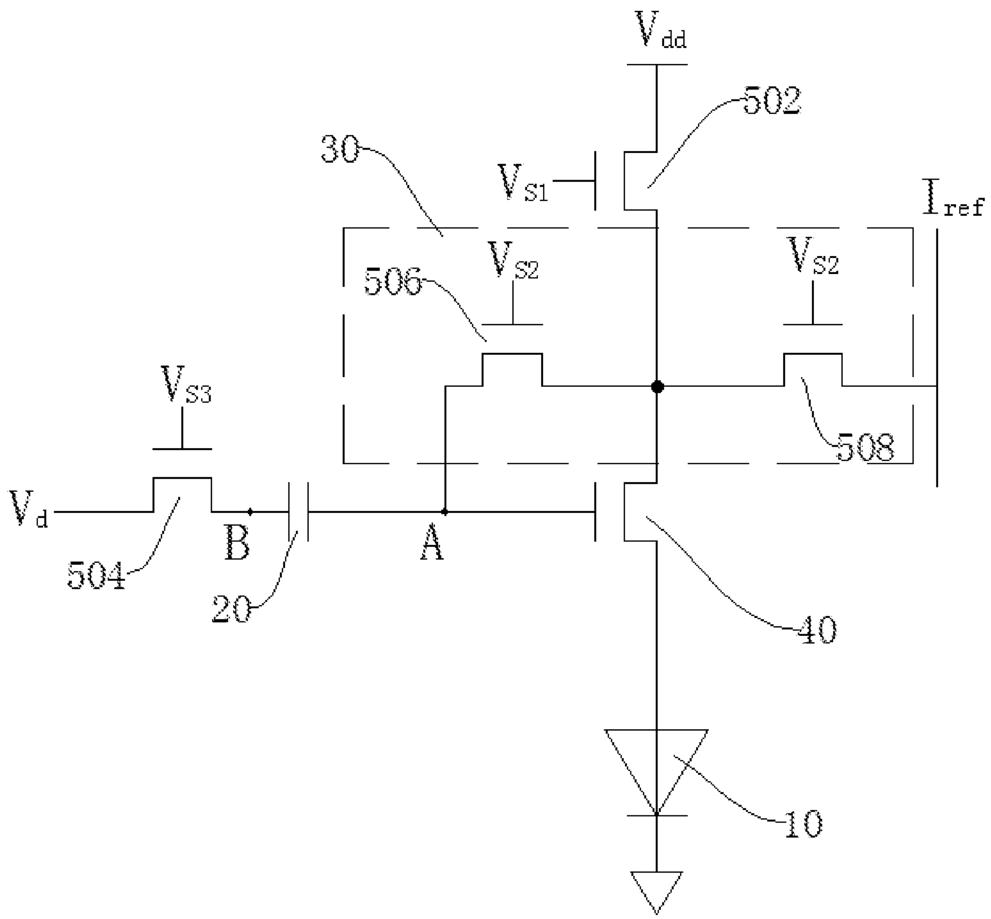
FIG. 1 is a schematic view showing the circuitry of the pixel driving circuit of the present invention.

Refer to FIG. 1. The pixel driving circuit of the present invention comprises: a driving power source, an organic light-emitting diode (OLED) 10, a driving switch 40, a first switch 502, a second switch 504, a storage unit 20 and a control circuit 30. Specifically, the driving switch 40 is connected between the driving power source and the OLED 10; and the driving power source is for driving the OLED 10 to emit light as well as driving other electronic elements of the display device. In the present embodiment, the driving switch 40 is a thin film transistor (TFT), which is a type of field effect transistor (FET), having a gate, a drain and a source. Moreover, the TFT comprises N-type TFT and P-type TFT. Take the N-type TFT as example. When the voltage difference $V_{gs}$ between the gate and the source is greater than the threshold voltage $V_{th}$, the drain and the source are conductive, and the current flows from the drain to the source, i.e., the current flows through the driving switch 40 to drive the OLED 10 to emit light. Therefore, controlling the voltage difference $V_{gs}$ between the gate and the source of the driving switch 40 is able to control the conduction or cut-off of the driving switch 40. Moreover, according to the equation:

$$I_{ds}=K(V_{gs}-V_{th})^2 \quad (1)$$

Wherein, K=μCoxW/(2L), and μ is the carrier migration rate of the driving switch 40, W and L are the width and length of the driving switch 40 respectively.

The current $I_{ds}$ flowing through the driving switch 40 to drive the OLED 10 depends on the voltage difference $V_{gs}$ between the gate and the source and the threshold voltage $V_{th}$. When the threshold voltage $V_{th}$ of the driving switch 40 drifts, the compensation to the threshold voltage $V_{th}$ drift of the driving switch 40 must be performed through the voltage difference $V_{gs}$ between the gate and the source.

The first switch 502 is connected between a drain of the driving switch 40 and the driving power source. The conduction or cut-off state of the first switch 502 directly affects whether the driving voltage $V_{dd}$ can affect the OLED 10. In the present embodiment, the first switch 502 is also a TFT, and the gate of the first switch 502 inputs the first control signal $V_{s1}$. Under the control of the first control signal $V_{s1}$, the conduction or cut-off state of the first switch 502 can be changed. Furthermore, the first control signal $V_{s1}$ is provided by a first scan line of the display panel.

The control circuit 30 is connected between a drain of the driving switch 40 and the driving power source, for inputting a second control signal $V_{s2}$ and outputting a compensation current $I_{ref}$ to compensate threshold voltage $V_{th}$ drift of the driving switch 40. Specifically, the second control signal $V_{s2}$ controls conduction and cut-off of the control circuit 30, so as to control whether the compensation current $I_{ref}$ can flow to the driving switch 40. In the present embodiment, the second control signal $V_{s2}$ is provided by a second scan line of the display panel.

The storage unit 20 is connected between a gate of the driving switch 40, for storing charge and releasing charge. The storage unit 20 stores different voltages at different time periods. Specifically, in the first time period, the storage unit 20 stores a compensation voltage of the compensation current $I_{ref}$ provided to the driving switch 40; in the second time period, the storage unit 20 stores a data voltage $V_{data}$; in the third time period, the storage unit 20 releases both the compensation voltage and the data voltage $V_{data}$. In a preferred embodiment, the storage unit 20 is a capacitor; in other embodiments, the storage unit 20 can also be electronic elements with storage function.

The second switch 504 has a source connected to the storage unit 20, a drain connected to a data line, and a gate connected to a third scan line. The third scan line outputs a third control signal $V_{s3}$ to the gate, the data line outputs a data signal $V_d$ to the second switch 504, and stores the data signal $V_d$ in a form of data voltage $V_{data}$ in the storage unit 20 for subsequent outputting to the driving switch 40 to control the OLED 10 to emit light.

In the first time period, the compensation current $I_{ref}$ compensates the threshold voltage $V_{th}$ drift of the driving switch 40, and is stored in a form of compensation voltage in the storage unit 20. In the second time period, the storage unit 20 stores the data voltage $V_{data}$, and in the third time period, releases both the compensation voltage and the data voltage $V_{data}$ to control the driving voltage $V_{dd}$ to drive the OLED 10 to emit light. The compensation current $I_{ref}$ and the data signal $V_d$ are independently applied to the pixel driving circuit. Without affecting the data signal, the threshold voltage $V_{th}$ drift of the driving switch 40 is compensated and the current through the OLED 10 is stable, leading to uniform luminance of the display panel.

In the present embodiment, the control circuit 30 comprises: a compensation current output end, a third switch 506, and a fourth switch 508. The compensation current output end is for outputting the compensation current $I_{ref}$; the compensation current $I_{ref}$ flows passing the third switch 506 and the fourth switch 508 and to the first switch 502. Moreover, the third switch 506 is connected between the compensation current output end and the drain of the driving switch 502, and the fourth switch 508 is connected between the gate and the drain of the driving switch 40. The gate of the third switch 506 and the gate of the fourth switch 508 are for inputting the second control signal $V_{s2}$. Under the control of the second control signal $V_{s2}$, the third switch 506 and the fourth switch 508 maintain the same conduction/cut-off state simultaneously. When both the third switch 506 and the fourth switch 508 are conductive, the gate and the drain of the driving switch 502 are shorted by the third switch 506, and the driving switch 502 is equivalent to a diode. The compensation current $I_{ref}$ flows through the driving switch 40 to compensate the threshold voltage $V_{th}$ drift of the driving switch 40, and is stored in a form of compensation voltage in the storage unit 20, for subsequent (in the third time period) compensation of the threshold voltage $V_{th}$ drift of the driving switch 40.

In another embodiment, the first switch 502, the second switch 504, the third switch 506, and the fourth switch 508 are N-type thin film transistors (TFT). In other embodiments, the first switch 502, the second switch 504, the third switch 506, and the fourth switch 508 are P-type TFTs.

In the first time period, the compensation current $I_{ref}$ compensates the threshold voltage $V_{th}$ drift of the driving switch 40, and is stored in a form of compensation voltage in the storage unit 20. In the second time period, the storage unit 20 stores the data voltage $V_{data}$, and in the third time period, releases both the compensation voltage and the data voltage $V_{data}$ to control the driving voltage $V_{dd}$ to drive the OLED 10 to emit light. The compensation current $I_{ref}$ and the data signal $V_d$ are independently applied to the pixel driving circuit. Without affecting the data signal, the threshold voltage $V_{th}$ drift of the driving switch 40 is compensated and the current through the OLED 10 is stable, leading to uniform luminance of the display panel.

The present invention also provides a display panel comprising the aforementioned pixel driving circuit.

The present invention also provides a pixel driving method, to be realized through the pixel driving circuit provided by the present invention. Specifically, the pixel driving circuit comprises: a driving power source, an OLED 10, a driving switch 40, a first switch 502, a second switch 504, a storage unit 20 and a control circuit 30; the driving switch 40 being connected between the driving power source and the OLED 10; the first switch 502 being connected between a drain of the driving switch 40 and the driving power source; the control circuit 30 being connected between a drain and a gate of the driving switch 40; the storage unit 20 being connected between a source of the second switch 504 and a gate of the first switch 502. In the present embodiment, the first switch 502, the second switch 504, the third switch 506, and the fourth switch 508 are N-type TFTs.

Figure 2:
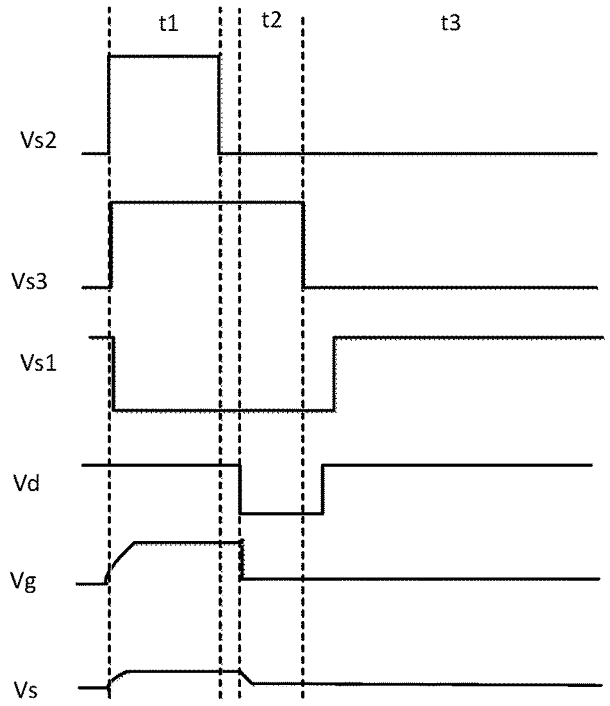
FIG. 2 is a schematic view showing the timing of the pixel driving method of the present invention.
Figure 3:
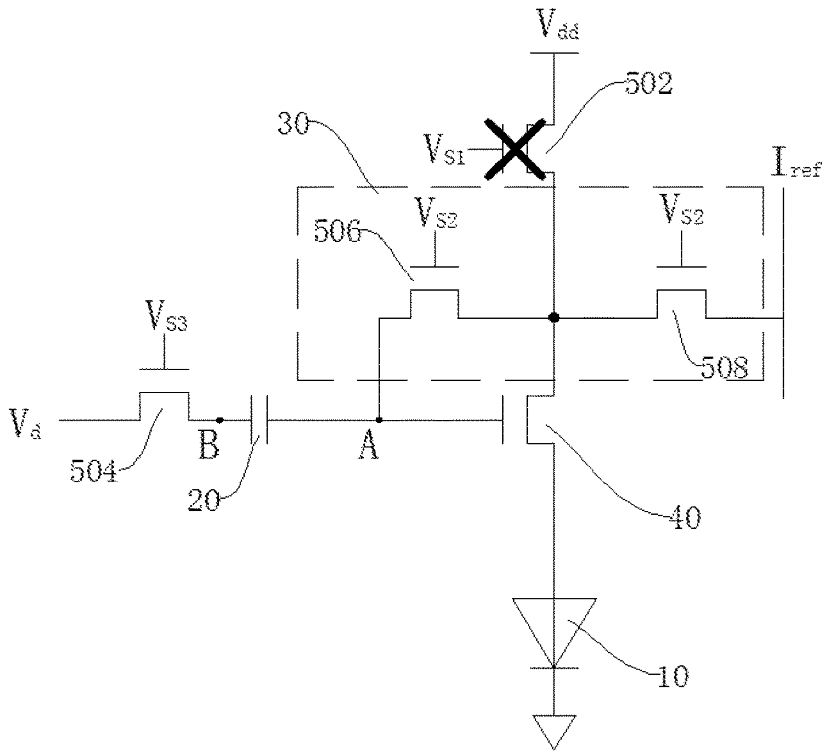
FIG. 3 is a schematic view showing the circuit state in the first time period of the pixel driving method of the present invention.

In combination of FIG. 2, the pixel driving method of the present invention comprises the following steps:

S101: in a first time period t1, in combination of FIG. 3, loading in a first control signal $V_{s1}$, a second control signal $V_{s2}$, and a third control signal $V_{s3}$, wherein the first control signal $V_{s1}$ is low voltage, and the second control signal $V_{s2}$ and a third control signal $V_{s3}$ are both at high voltage so as to make the second switch 504 and the control circuit 30 conductive, and the first switch 502 cut off. The control circuit 30 loads in a compensation current $I_{ref}$ to compensate threshold voltage $V_{th}$ drift of the driving switch 40, and stores a compensation voltage in the storage unit 20.

In the present embodiment, when the control circuit 30 is conductive, the gate and the drain of the driving switch 502 are shorted, and the driving switch 40 is equivalent to a diode. The compensation current $I_{ref}$ flows through the driving switch 40, i.e., $I_{ds}=I_{ref}$. According to equation (1), the voltage difference between the gate and the source of the driving switch 40 is:

$$V_{gs}=(I_{ds}/K)^{1/2}+V_{th}$$

Furthermore, because:

$$V_{gs}=V_g-V_s$$

$$V_s=V_{oled}$$

Thus, $V_g=(I_{ds}/K)^{1/2}+V_{th}+V_{oled}$

Wherein, $V_g$ is the potential of the gate of the driving switch 40, $V_s$ is the potential of the source of the driving switch 40, and $V_{oled}$ is the potential of the OLED 10.

Furthermore, assume that the storage unit 20 comprises a first connection end A and a second connection end B. The first connection end A has a potential $V_A$ equal to the potential of the gate $V_g$ of the first switch 502. That is, $$V_A=V_g=(I_{ds}/K)^{1/2}+V_{th}+V_{oled}$$

The second connection end B has a potential $V_B$ being a reference voltage $V_{ref}$ passing through the second switch 504 by the data line. That is, $$V_B=V_{ref}$$

The reference $V_{ref}$ is a reference value, for subsequent comparison with data voltage $V_{data}$.

Therefore, in the first time period t1, the potentials at the two ends of the storage unit 20 are $V_A=(I_{ds}/K)^{1/2}+V_{th}+V_{oled}$ and $V_B=V_{ref}$ respectively. The compensation current $I_{ref}$ compensating the threshold voltage $V_{th}$ drift of the driving switch 40 is stored in a compensation voltage in the storage unit 20, and in subsequent third time period t3 (light-emitting phase) to compensate the driving switch 40.

Figure 4:
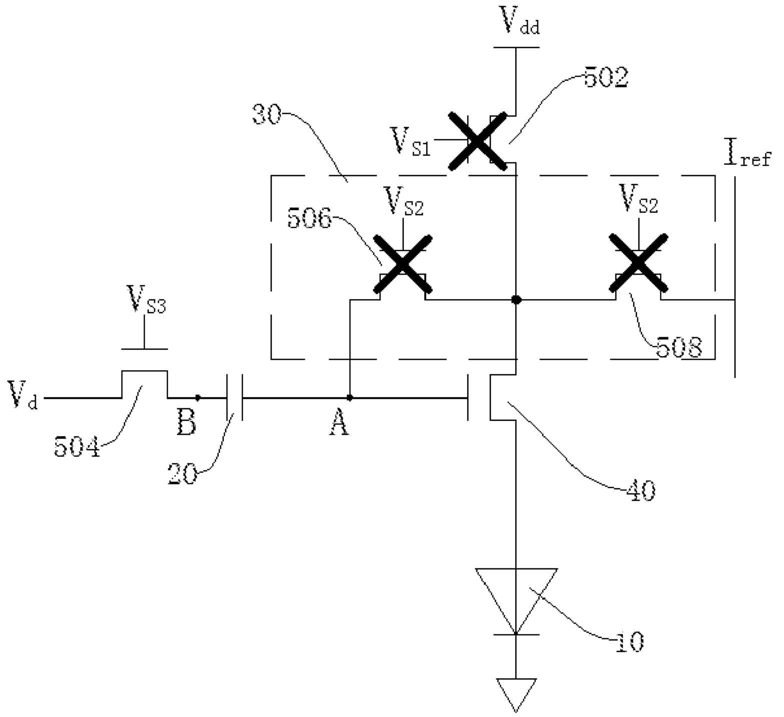
FIG. 4 is a schematic view showing the circuit state in the second time period of the pixel driving method of the present invention.

S102: in a second time period t2, in combination with FIG. 4, loading in the first control signal $V_{s1}$, the second control signal $V_{s2}$, and the third control signal $V_{s3}$, wherein the first control signal $V_{s1}$ and the second control signal $V_{s2}$ are low voltage, and the third control signal $V_{s3}$ is high voltage so that the second switch 504 is conductive and the control circuit and the first switch 502 are cut off. The data line outputs the data signal $V_d$ through the second switch 504 to the storage unit 20, and stores in the form of $V_{data}$ in the storage unit 20. In the mean time, the second connection end B of the storage unit 20 has the potential $V_B=V_d=V_{data}$, because the potentials at the two ends of the storage unit 20 cannot independently change suddenly, the potential $V_A$Of the first connection end A of the storage unit also changed by the same amount. Specifically, the amount of change in potential is $V_{data}-V_{ref}$, therefore, the potential of the first connection end A of the storage unit 20:

$$V_A=(I_{ds}/K)^{1/2}+V_{th}+V_{oled}+V_{data}-V_{ref}$$

Accordingly, in the second time period t2, the potentials of the two ends of the storage unit 20 are $V_A=(I_{ds}/K)^{1/2}+V_{th}+V_{oled}+V_{data}-V_{ref}$ and $V_B=V_{data}$ respectively; the storage unit 20 stores the data voltage $V_{data}$ for subsequent third time period (light-emitting phase) to control the driving switch 40 to make OLED 10 emit light.

Figure 5:
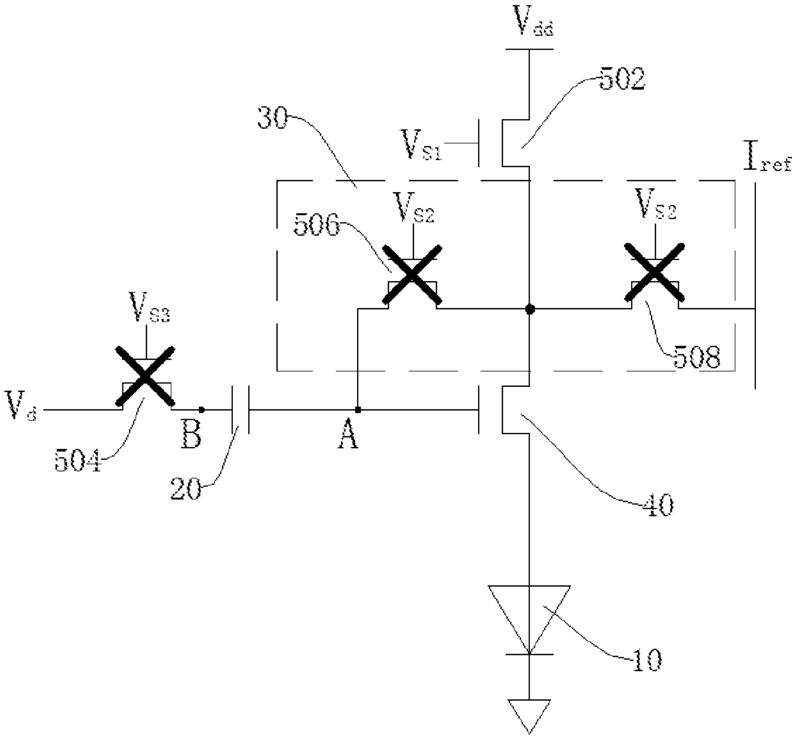
FIG. 5 is a schematic view showing the circuit state in the third time period of the pixel driving method of the present invention.

S103: in the third time period t3, in combination with FIG. 5, loading in the first control signal $V_{S1}$, the second control signal $V_{S2}$, and the third control signal $V_{s3}$, wherein the first control signal $V_{S1}$ is high voltage, and the second control signal $V_{S2}$ and the third control signal $V_{s3}$ are both low voltages, and the second switch 504 and the control circuit 30 are both cut off, while the first switch 502 is conductive. The storage unit 20 applies the compensation voltage and the data voltage $V_{data}$ to the gate of the driving switch 40, and the driving power source drives the OLED 10 to emit light. Specifically, the storage unit 20 discharges, and the potential $V_A$ of the first connection end A of the storage unit $V_A=(I_{ds}/K)^{1/2}+V_{th}+V_{oled}+V_{data}-V_{ref}$, comprising the compensation voltage for compensating the threshold voltage $V_{th}$ drift of the driving switch 40 in the first time period t1 and the data voltage $V_{data}$ of the data signal $V_d$ provided by the data line. As such, the current flowing through the OLED 10 is stable and the luminance for the display panel is uniform.

In the first time period t1, the compensation current $I_{ref}$ compensates the threshold voltage $V_{th}$ drift of the driving switch 40, and is stored in a form of compensation voltage in the storage unit 20. In the second time period t2, the storage unit 20 stores the data voltage $V_{data}$, and in the third time period t3, releases both the compensation voltage and the data voltage $V_{data}$ to control the driving voltage $V_{dd}$ to drive the OLED 10 to emit light. The compensation current $I_{ref}$ and the data signal $V_d$ are independently applied to the pixel driving circuit. Without affecting the data signal, the threshold voltage $V_{th}$ drift of the driving switch 40 is compensated and the current through the OLED 10 is stable, leading to uniform luminance of the display panel.

In the present embodiment, the control circuit 30 comprises: a compensation current output end, a third switch 506, and a fourth switch 508. The compensation current output end is for outputting the compensation current $I_{ref}$; the compensation current $I_{ref}$ flows passing the third switch 506 and the fourth switch 508 and to the first switch 502. Moreover, the third switch 506 is connected between the compensation current output end and the drain of the driving switch 40, and the fourth switch 508 is connected between the gate and the drain of the driving switch 40. The gate of the third switch 506 and the gate of the fourth switch 508 are for inputting the second control signal $V_{s2}$. Under the control of the second control signal $V_{s2}$, the third switch 506 and the fourth switch 508 maintain the same conduction/cut-off state simultaneously. When both the third switch 506 and the fourth switch 508 are conductive, the gate and the drain of the driving switch 40 are shorted by the third switch 506, and the driving switch 40 is equivalent to a diode. The compensation current $I_{ref}$ flows through the driving switch 40 to compensate the threshold voltage $V_{th}$ drift of the driving switch 40, and is stored in a form of compensation voltage in the storage unit 20, for subsequent (in the third time period) compensation of the threshold voltage $V_{th}$ drift of the driving switch 40.

In another embodiment, the first switch 502, the second switch 504, the third switch 506, and the fourth switch 508 are N-type TFTs. In other embodiments, the first switch 502, the second switch 504, the third switch 506, and the fourth switch 508 are P-type TFTs.

In a preferred embodiment, a transitional time period is provided between the first time period t1 and the second time period t2, and between the second time period t2 and the third time period t3, for reserving time to propagate the first control signal $V_{s1}$, the second control signal $V_{s2}$, the third control signal $V_{s3}$, and the data signal $V_d$.

In the first time period t1, the compensation current $I_{ref}$ compensates the threshold voltage $V_{th}$ drift of the driving switch 40, and is stored in a form of compensation voltage in the storage unit 20. In the second time period t2, the storage unit 20 stores the data voltage $V_{data}$, and in the third time period t3, releases both the compensation voltage and the data voltage $V_{data}$ to control the driving voltage $V_{dd}$ to drive the OLED 10 to emit light. The compensation current $I_{ref}$ and the data signal $V_d$ are independently applied to the pixel driving circuit. Without affecting the data signal, the threshold voltage $V_{th}$ drift of the driving switch 40 is compensated and the current through the OLED 10 is stable, leading to uniform luminance of the display panel.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A pixel driving circuit, comprising:

a driving switch, connected between a driving power source and an organic light-emitting diode (OLED);

a first switch, connected between a drain of the driving switch and the driving power source, for inputting a first control signal;

a control circuit for inputting a second control signal and outputting a compensation current to compensate threshold voltage drift of the driving switch; wherein the control circuit comprises:

a compensation current output end, for outputting the compensation current;

a third switch, connected directly to the compensation current output end and the drain of the driving switch, and having a gate for inputting the second control signal;

a fourth switch, connected directly to the gate and the drain of the driving switch, and having a gate for inputting the second control signal;

a storage unit, connected between a source of a second switch and a gate of the driving switch, for storing a compensation voltage of the compensation current provided to the driving switch;

the second switch having a gate for inputting a third control signal and a drain for inputting a data signal, the storage unit being for storing a data voltage generated by the data signal; wherein the second control signal and the third control signal are different; and the storage unit being for applying the compensation voltage and the data voltage to the driving switch.

2. The pixel driving method as claimed in claim 1, wherein the first switch, the second switch, the third switch, and the fourth switch are N-type thin film transistors (TFT).

3. The pixel driving method as claimed in claim 1, wherein the first switch, the second switch, the third switch, and the fourth switch are P-type thin film transistors (TFT).

4. A display panel, comprising a pixel driving circuit, and the pixel driving circuit comprising:

a driving switch, connected between a driving power source and an organic light-emitting diode (OLED);

a first switch, connected between a drain of the driving switch and the driving power source, for inputting a first control signal;

a control circuit for inputting a second control signal and outputting a compensation current to compensate threshold voltage drift of the driving switch; wherein the control circuit comprises:

a compensation current output end, for outputting the compensation current;

a third switch, connected directly to the compensation current output end and the drain of the driving switch, and having a gate for inputting the second control signal;

a fourth switch, connected directly to the gate and the drain of the driving switch, and having a gate for inputting the second control signal;

a storage unit, connected between a source of a second switch and a gate of the driving switch, for storing a compensation voltage of the compensation current provided to the driving switch;

the second switch having a gate for inputting a third control signal and a drain for inputting a data signal, the storage unit being for storing a data voltage generated by the data signal; wherein the second control signal and the third control signal are different; and the storage unit being for applying the compensation voltage and the data voltage to the driving switch.

5. The pixel driving method as claimed in claim 4, wherein the first switch, the second switch, the third switch, and the fourth switch are N-type thin film transistors (TFT).

6. The pixel driving method as claimed in claim 4, wherein the first switch, the second switch, the third switch, and the fourth switch are P-type thin film transistors (TFT).

7. A pixel driving method, providing a pixel driving circuit, the pixel driving circuit comprising: a driving power source, an organic light-emitting diode (OLED), a driving switch, a first switch having a gate for inputting a first control signal, a second switch having a gate for inputting a third control signal, a storage unit and a control circuit; the driving switch being connected between the driving power source and the OLED; the first switch being connected between a drain of the driving switch and the driving power source; a control circuit comprises: a compensation current output end, for outputting the compensation current; a third switch, connected directly to the compensation current output end and the drain of the driving switch, and having a gate for inputting a second control signal; a fourth switch, connected directly to the gate and the drain of the driving switch, and having a gate for inputting the second control signal; wherein the second control signal and the third control signal are different; the storage unit being connected between a source of the second switch and a gate of the driving switch; the method comprising:

in a first time period, loading in the first control signal, the second control signal, and the third control signal, conducting the second switch and the control circuit, cutting off the first switch, the control circuit loading in a compensation current to compensate threshold voltage drift of the driving switch, and storing a compensation voltage in the storage unit;

in a second time period, loading in the first control signal, the second control signal, and the third control signal, conducting the second switch and cutting off the control circuit and the first switch, outputting a data signal to the storage unit, and the storage unit storing a data voltage generated by the data signal;

in the third time period, loading in the first control signal, the second control signal, and the third control signal, conducting the first switch and cutting off the second switch and the control circuit, the storage unit applying the compensation voltage and the data voltage to a gate of the driving switch, the driving power source driving the OLED to emit light.

8. The pixel driving method as claimed in claim 7, wherein the first switch, the second switch, the third switch, and the fourth switch are N-type thin film transistors (TFT).

9. The pixel driving method as claimed in claim 7, wherein the first switch, the second switch, the third switch, and the fourth switch are P-type thin film transistors (TFT).

10. The pixel driving method as claimed in claim 7, wherein a transitional time period is provided between the first time period and the second time period, and between the second time period and the third time period, for reserving time to propagate the first control signal, the second control signal, the third control signal, and the data signal.

* * * * *